April 29, 1941.  E. W. SIBLEY  2,240,381

VALVE MECHANISM FOR WINDSHIELD CLEANER MOTORS

Filed March 6, 1939

INVENTOR
Edward W. Sibley,
BY
Bean, Brooks, Buckley & Bean.
ATTORNEYS

Patented Apr. 29, 1941

2,240,381

UNITED STATES PATENT OFFICE 2,240,381

VALVE MECHANISM FOR WINDSHIELD CLEANER MOTORS

Edward W. Sibley, Kenmore, N. Y., assignor to Trico Products Corporation, Buffalo, N. Y.

Application March 6, 1939, Serial No. 260,007

6 Claims. (Cl. 121—143)

This invention relates to a windshield cleaner and primarily to improved means for controlling the operation of the windshield wiping squeegee.

Heretofore a special valve has been employed to throttle and control the operation of the wiper. It is the object of the present invention to simplify the control means and the manipulation thereof. More specifically the invention resides in the embodiment of the control means in the valve action for effecting a throttling of the windshield cleaner motor to regulate the speed of operation of the wiper. It is a further object of the invention to embody means in the valve action for arresting or parking the wiper to one side of the field of vision.

In the accompanying drawing—

Figure 1:
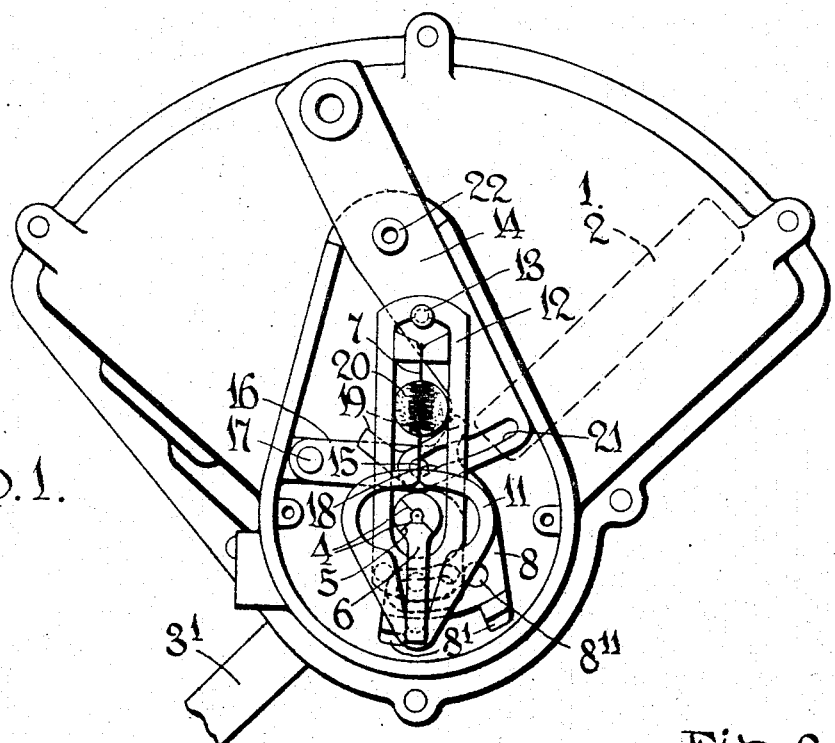
Fig. 1 is an elevation of a motor having a valve mechanism constructed in accordance with the present invention.
Figure 2:
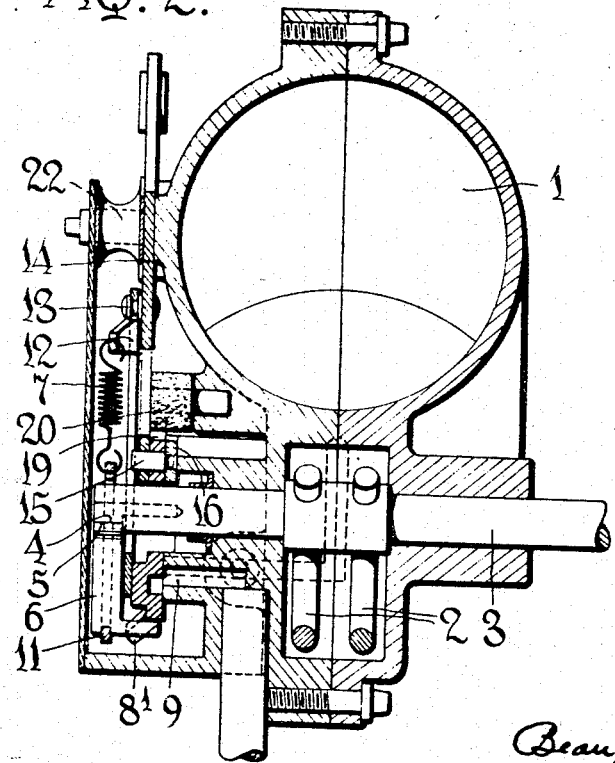
Fig. 2 is a transverse section therethrough.

Referring more particularly to the accompanying drawing, the numeral 1 designates the motor chamber in which a piston carried by the arm 2 reciprocates, the arm being fixed to the motor shaft 3 which has its outer end adapted for connection to a wiper 3' and its inner end formed with a cutaway part providing a pair of shoulders 4 designed to alternately engage a cooperating part 5 on a valve kicker 6 which latter acts under the influence of spring 7 and engages alternately the shoulders 8' to shift the valve 8 back and forth on its seat. The seat is provided with a fluid supply or suction port 9 and oppositely arranged chamber ports 10 establishing communication with the chamber 1 at opposite sides of the piston. The valve 8 is designed to connect the supply port alternately with the chamber ports and to open the unconnected chamber port to the atmosphere thereby providing the required operating pressure differential for actuating the piston and its connected shaft 3. For the purpose of admitting atmosphere into the right port 10 the valve body may be cut away or it may be provided with an opening 8''. The spring 7 is connected at one end by the hanger 11 and at its opposite end is anchored to a pressure plate 12 which is pivotally suspended from a pin 13 carried by the control lever 14 in such manner that the opposite end of the plate 12 exerts a light pressure on the valve 8 to urge the latter toward its seat.

The valve is pivotally mounted by a pin 15 on a throttle lever 16, the latter being pivotally connected to the motor housing as at 17, so that by swinging the lever downwardly toward the shaft 3, as shown in Fig. 1, the valve 8 will be shifted laterally of its normal path of movement to decrease the capacity of the valve seat ports 9 and 10 and thereby impose a throttling action on the motor.

According to the present disclosure this throttling movement is imparted to the lever 16, or to the valve direct, by a cam slot 18 formed in the lower end of the control lever 14. The valve is provided with limit ears 19 engageable with an interposed stop 20 to determine the extent of valve movement.

Figure 3:
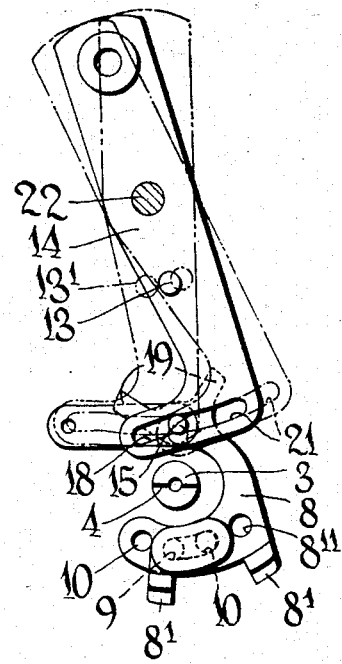
Fig. 3 is a diagrammatic view illustrating the different positions of adjustment in the throttle control.

For arresting the wiper, or its motor, the lever 14 is swung to move the pin 13 to the left, as indicated at 13' in Fig. 3, thereby disposing the line of spring force acting on the kicker to a position from which it cannot be shifted across the axis 15, and in order to permit such freedom of movement of the control lever 14 without disturbing the throttling means the cam slot 18 is continued in an arc 21 concentric with the pivot 22 of the lever. The parts are so related that throttling movement of the lever 14 will not displace the line of spring force from an operative position. The concentric slot 21 provides for an idling relation between the control lever and the throttling means.

The normal operating position of the control lever is adjacent the inner end of the cam slot 18 with the pin engaging in the concentric slot 21, from which intermediate position the lever may be swung in either direction to either arrest the cleaner motor or to throttle the wiping action.

From the foregoing it will be observed that the throttling and arresting action of the motor is accomplished solely through the automatic valve action and without the intermediary of special valving equipment.

It will be understood that the construction described and shown herein is merely illustrative of the principles herein involved, which may be applied to other physical embodiments without departing from the scope and spirit of the invention claimed.

I claim:

1. An automatic valve action for fluid motors, comprising a valve movable back and forth on a seat and provided with a passage to connect a supply port to one or the other of two chamber ports for reversing the pressure differential on the motor piston, throttle means supporting the valve for bodily shifting movement on its seat laterally of its path of reciprocatory movement to offset the valve passage with respect to the ports to restrict the port capacity, and means for actuating the throttle means.

2. A valve mechanism for fluid motors comprising a valve movable back and forth on its seat to connect a supply port to one or the other of two chamber ports for reversing the pressure differential on the motor piston, and means for shifting the valve relative to its seat laterally of its path of movement to restrict the port capacities and thereby impose a throttling effect on the piston.

3. A valve mechanism for fluid motors, comprising a valve movable back and forth on its seat to connect a supply port to one or the other of two chamber ports for reversing the pressure differential on the motor piston, means for shifting the valve relative to its seat laterally of its path of movement to restrict the port capacities and thereby impose a throttling effect on the motor, and means for holding the valve mechanism inoperative against reversal.

4. A valve mechanism for fluid motors, comprising a valve movable back and forth on its seat to connect a supply port to one or the other of two chamber ports for reversing the pressure differential on the motor piston, throttle means supporting the valve for shifting movement on its seat laterally of its reciprocatory movement to restrict the port capacity, a snap action for reciprocating the valve and embodying a spring connected at one end to the valve, a movable control member on which the opposite end of the spring is anchored for being shifted to a motor arresting position, and means operable by the control member for actuating the throttle means independently of the arresting action.

5. A valve mechanism for fluid motors, comprising a valve movable back and forth on its seat to connect a supply port to one or the other of two chamber ports for reversing the pressure differential on the motor piston, throttle means supporting the valve for shifting movement on its seat laterally of its reciprocatory movement to restrict the port capacity, a snap action for reciprocating the valve and embodying a spring connected at one end to the valve, and a movable control member on which the opposite end of the spring is anchored for being shifted to a motor arresting position, said control member being selectively operable to actuate the throttle means or the arresting means.

6. A valve mechanism for fluid motors, comprising a valve movable back and forth on its seat to connect a supply port to one or the other of two chamber ports for reversing the pressure differential on the motor piston, a snap action for reciprocating the valve and embodying a spring connected at one end to the valve, and a pivotally mounted control member on which the opposite end of the spring is anchored for being shifted to a motor arresting position against reciprocating the valve.

EDWARD W. SIBLEY.